US000001957H

(19) United States

(12) Statutory Invention Registration (10) Reg. No.: US H1957 H

Fried et al. (43) Published: Apr. 3, 2001

(54) IMMEDIATE TERMINATION OF FREE RADICAL POLYMERIZATIONS

(75) Inventors: Michael Fried, Heidelberg; Gerhard Nestler, Ludwigshafen, both of (DE); Paul Leon Kageler, Lake Jackson, TX (US); Lawrence Edwin James, Grosse Ile, MI (US)

(73) Assignee: BASF Aktiengesellschaft, Ludwigshafen (DE)

(21) Appl. No.: 08/960,356

(22) Filed: Oct. 29, 1997

(51) Int. Cl.[7] ..... C08F 2/38

(52) U.S. Cl. ..... 526/82; 526/83; 526/85

(58) Field of Search ..... 526/82, 83, 85

(56) References Cited

U.S. PATENT DOCUMENTS

| | | | | |
|---|---|---|---|---|
| 4,987,210 | * | 1/1991 | Login | 526/258 |
| 5,089,376 | * | 2/1992 | Setthachayanon | 430/284 |
| 5,102,774 | * | 4/1992 | Setthachayanon | 430/284 |
| 5,103,043 | * | 4/1992 | Drent | 560/207 |
| 5,466,770 | * | 11/1995 | Audenaert | 528/60 |

FOREIGN PATENT DOCUMENTS

| | | |
|---|---|---|
| 0 064 628 | 11/1982 | (EP) . |
| 0 200 181 | 12/1986 | (EP) . |

OTHER PUBLICATIONS

Research Disclosure, p. 245, Apr. 1989.

L.B. Levy, et al., Process Saf. Prog. vol. 12, No. 2, AN 121:58086, "Emergency Response Shortstop Inhibition During the Approach to an Acrylic Acid Runaway Polymerization," 1993.

* cited by examiner

*Primary Examiner*—Charles T. Jordan

*Assistant Examiner*—Aileen J. Baker

(74) *Attorney, Agent, or Firm*—Oblon, Spivak, McClelland, Maier & Neustadt, P.C.

(57) ABSTRACT

Free radical polymerizations are immediately terminated by adding a phenothiazine-containing solution whose solvent comprises at least 50% of its weight of an N-alkylpyrrolidone.

10 Claims, No Drawings

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

IMMEDIATE TERMINATION OF FREE RADICAL POLYMERIZATIONS

The present invention relates to a process for the immediate termination of free radical polymerizations. Once initiated, free radical polymerizations are usually highly exothermic, ie. take place with considerable evolution of heat, the heat of polymerization, unless removed, additionally accelerating the free radical polymerization.

If the abovementioned heat removal takes place in an inadequate manner in intentional free radical polymerizations, there is a danger that the polymerization will be so vigorous that the vessel containing the polymerization mixture will explode if the runaway polymerization (for example, free radical mass, solution, emulsion or suspension polymerization of compounds (monomers) having at least one ethylenically unsaturated group) is not counteracted. However, such an effective countermeasure is also required in particular in the case of unintentionally initiated free radical polymerizations. Unintentionally initiated free radical polymerizations may occur, for example, during the storage and/or transport of substances containing monomers, since both heat and light or undesired free radicals can initiate the free radical polymerization of monomers. It is true that an attempt is usually made to prevent such unintentional free radical polymerizations by adding small amounts (as a rule up to 1000 ppm by weight) of free radical polymerization inhibitors (free radical acceptors, polymerization inhibitors) to the monomers. However, their inhibiting effect must not be too pronounced since otherwise they would have to be separated off before subsequent use of the monomers for free radical polymerization purposes. However, free radical polymerization initiators can usually predominate over a moderately inhibiting effect, as possessed, for example, by the monomethyl ether of hydroquinone (MEHQ), and it is for this reason that MEHQ is a storage and/or transport stabilizer particularly frequently used for monomers. However, experience has shown that, even in the case of monomers stabilized with storage and/or transport stabilizers, an unintentional free radical polymerization of said monomers cannot be completely ruled out. The latter applies in particular when the monomers are (meth)acrylic monomers and/or styrene, which particularly readily undergo free radical polymerization.

The term (meth)acrylic monomers is to be understood here as meaning substances which comprise acrolein, methacrolein, acrylic acid, methacrylic acid and/or esters of the two abovementioned acids. In this publication, (meth) acrylic is generally used as an abbreviation for acrylic and/or methacrylic.

Especially substances which comprise at least 90% by weight of (meth)acrylic monomers and/or styrene are at risk with regard to an unintentional free radical polymerization (this also applies when polymerization inhibitors are added as a preventive measure). This applies in particular when such substances are exposed to extreme external conditions during transport and/or during storage (for example, extremely, high temperatures during transport by ship through various climatic zones (eg. across the equator), as is the case, for example, for transport from Europe to Southeast Asia, or extremely low temperatures, as in the case of storage in outdoor tanks in northern countries). In particular, low temperatures are not without risks since they can in extreme cases lead to partial or complete crystallization of the monomers. The latter usually results in separation of monomers and stabilizer (purification by crystallization), which may lead to the presence of unstabilized regions of monomers and subsequent melting for a certain duration, which regions can with high probability be the starting point of an unintentional free radical polymerization.

For safe transport and/or safe storage of monomer-containing substances, there is therefore a need for a process which is capable of very rapidly terminating an unintentionally initiated free radical polymerization of the monomers. Such a process is also required, however, for stopping runaway unintentional free radical polymerizations immediately.

It is an object of the present invention to provide such a process in a very advantageous and very broadly applicable manner.

We have found that this object is achieved by a process for immediately terminating free radical polymerizations by adding a phenothiazine-containing inhibitor solution to the system undergoing free radical polymerization, wherein the solvent of the inhibitor solution comprises at least 50% of its weight of an N-alkylpyrrolidone.

The advantageous nature of the novel process is a result of intensive and extensive research activity, as follows:

compared with the recommendation of EP-B 64628 and EP-A 200181 to add a polymerization inhibitor solution based on hydroquinone or butylpyrocatechol or derivatives thereof for immediately terminating a free radical polymerization, the inhibitor solution to be added according to the invention containing phenothiazine contains a substantially more efficient and more broadly applicable free radical polymerization inhibitor;

compared with the recommendation of Res. Dicl. 1989, 300, 245 (Eng.) to add an aqueous Cu(II) salt solution for immediately terminating an unintentional free radical polymerization of acrylic acid, inhibitor solutions based on N-alkylpyrrolidone are as a rule, on the one hand, miscible both with aqueous and with nonaqueous systems and, on the other hand, also subsequently readily separable from such systems;

Process Saf. Prog. 12(2) (1993), 112–114 recommends, for immediately terminating an unintentional free radical polymerization of acrylic acid, adding thereto an inhibitor solution based on phenothiazine, but this prior art contains no indication that the phenothiazine is to be added in solution in a solvent comprising mainly N-alkylpyrrolidone.

Further advantages of the novel procedure are that N-alkylpyrrolidones are inert to most substances. Furthermore, the boiling point of N-alkylpyrrolidones is above the boiling point of most monomers, facilitating subsequent separation from the monomers and permitting subsequent further use of the monomers. Moreover, the high boiling point of the N-alkylpyrrolidones prevents the formation of explosive vapor/oxygen mixtures in hot climatic zones. Furthermore, N-alkylpyrrolidones generally have a low melting point, which permits their use even in northern countries. Another advantage is the low flashpoint of N-alkylpyrrolidones and their low toxicity, if they are toxic at all. However, the fact that phenothiazine has high solubility in N-alkylpyrrolidone at room temperature (25° C.) is very particularly advantageous for the novel process. This permits the novel use of phenothiazine solutions having a high phenothiazine content without the risk of the phenothiazine being immediately partially or completely precipitated from the solution with a change of outdoor temperature.

The addition of phenothiazine as such for immediately terminating free radical polymerizations is a disadvantage in that the low degree of division of the phenothiazine as such is not appropriate for the required immediate termination.

N-alkylpyrrolidones preferred according to the invention are those with alkyl groups of 1 to 8 carbon atoms. Particularly preferred among these are the N-alkylpyrrolidones whose alkyl group is of 1 to 6 carbon atoms. Very particularly preferred N-alkylpyrrolidones are N-methylpyrrolidone and N-ethylpyrrolidone.

In addition to N-alkylpyrrolidones, the phenothiazine solution to be added according to the invention may also contain other solvents. Suitable solvents of this type are all those which are miscible with N-alkylpyrrolidones. Examples of such solvents are biphenyl, diphenyl ether, toluene, xylene, dimethyl phthalate, butyl acetate and 2-ethylhexyl acetate. N,N-dialkylcarboxamides whose alkyl groups are preferably of 1 to 8 carbon atoms are furthermore suitable as such other solvents. Particularly advantageous alkyl groups are methyl, ethyl and n-butyl. N,N-dialkylcarboxamides of $C_1$–$C_3$-alkanecarboxylic acids are also particularly advantageous. N,N-dialkylcarboxamides particularly advantageous according to the invention are N,N-dimethylformamide and N,N-dimethylacetamide.

The solvent of the phenothiazine solution to be added according to the invention preferably comprises at least 75%, particularly preferably at least 85%, very particularly preferably at least 95%, based on the weight of said solvent, of N-alkylpyrrolidone. According to the invention, the solvent of the phenothiazine solution advantageously consists exclusively of N-alkylpyrrolidone, in particular exclusively of N-methylpyrrolidone or exclusively of N-ethylpyrrolidone.

In addition to phenothiazine, the inhibitor solution to be added according to the invention may also contain other polymerization inhibitors. Examples of these are hydroquinone, diphenylamine, p-phenylenediamines, nitroxyl radicals (compounds which have at least one >N—O— group), compounds which have a nitroso group, ie. a group —N═O, and hydroxylamines.

Nitroxyl radicals (also referred to as N-oxyl radicals) which are particularly suitable according to the invention are those derived from a secondary amine which carries no hydrogen atoms on the α-carbon atoms (ie. the N-oxyl groups are derived from corresponding secondary amino groups). Particularly suitable among these are the N-oxyl radicals which are stated in EP-A 135280, the prior application DE-A 19651307, U.S. Pat. No. 5,322,912, U.S. Pat. No. 5,412,047, U.S. Pat. No. 4,581,429, DE-A 1618141, CN-A 1052847, U.S. Pat. No. 4,670,131, U.S. Pat. No. 5,322,960, the prior application DE-A 19602539, EP-A 765856 JP-A 5/320217.

Such suitable, stable N-oxyl radicals derived from a second amine are, for example, those of the general formula I (I)

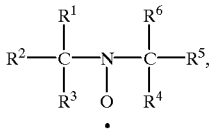

where $R^1$, $R^2$, $R^5$ and $R^6$ are the same or different straight-chain or branched, unsubstituted or substituted alkyl groups and $R^3$ and $R^4$ are the same or different straight-chain or branched, unsubstituted or substituted alkyl groups or $R^3CNCR^4$ is an unsubstituted or substituted, cyclic structure.

Compounds I which are particularly suitable according to the invention are those which are stated in EP-A 135 280, the prior application DE-A 19651307, U.S. Pat. No. 5,322,912, U.S. Pat. No. 5,412,047, U.S. Pat. No. 4,581,429, DE-A 16 18 141, CN-A 1052847, U.S. Pat. No. 4,670,131, U.S. Pat. No. 5,322,960 and the prior application DE-A 19602539.

Examples of these are the stable N-oxyl radicals of the general formula I where $R^1$, $R^2$, $R^5$ and $R^6$ are (identical or different) $C_1$–$C_4$ alkyl groups, such as methyl, ethyl, n-propyl, isopropyl, n-butyl, isobutyl or tert-butyl, linear or branched pentyl, phenyl or a substituted group thereof and $R^3$ and $R^4$ are (identical or different) $C_1$–$C_4$ alkyl groups, such as methyl, ethyl, n-propyl, isopropyl, n-butyl, isobutyl or tert-butyl, linear or branched pentyl or a substituted group thereof or, together with CNC, are the cyclic structure

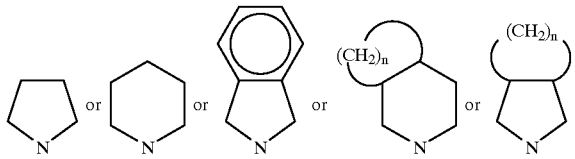

where n is an integer from 1 to 10 (frequently from 1 to 6), including substituted cyclic structures of this type. Typical examples are 2,2,6,6-tetramethyl-1-oxylpiperidine, 2,2,5,5-tetramethyl-1-oxylpyrrolidine and 4-oxo-2,2,6,6-tetramethyl-1-oxylpiperdine.

The N-oxyl radicals I can be prepared from the corresponding secondary amines by oxidation, for example with hydrogen peroxide. As a rule, they can be prepared as pure substance.

The N-oxyl radicals I suitable according to the invention include in particular piperidine- or pyrrolidine-N-oxyls and di-N-oxyls of the following general formulae II to IX;

(II)

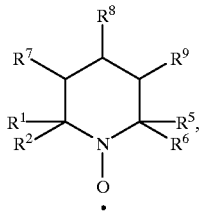

(III)

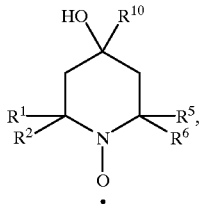

(IV)

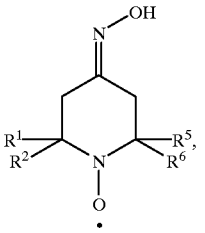

-continued (V)

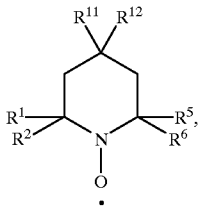

(VI)

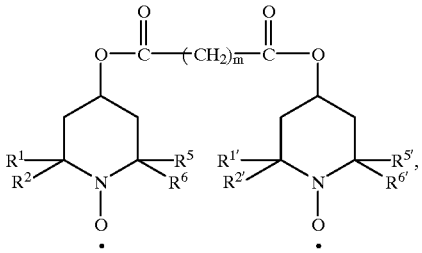

(VII)

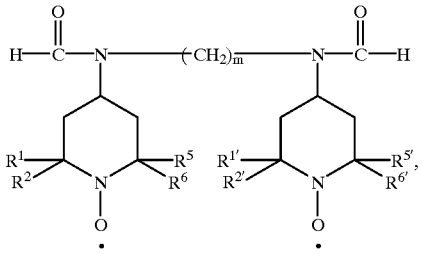

(VIII)

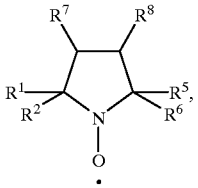

(IX)

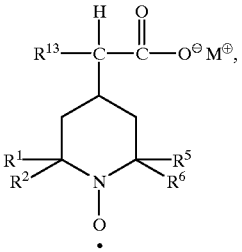

where m is from 2 to 10, $R^7$, $R^8$ and $R^9$, independently of one another, are each

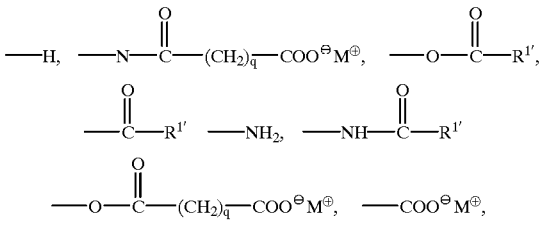

-continued

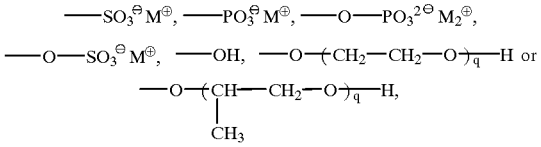

$M^{\oplus}$ is a hydrogen ion or an alkali metal ion, q is an integer from 1 to 10, $R^1$, $R^2$, $R^5$, $R^6$, independently of one another, and independently of $R^1$, $R^2$, $R^5$ and $R^6$, are the same groups as $R^1$, $R^{10}$ is $C_1$–$C_4$-alkyl, —CH═$CH_2$, —C≡CH, —CN,

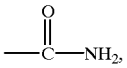

—$COO^{\ominus}M^{\oplus}$, —$COOCH_3$ or —$COOC_2H_5$, $R^{11}$ is an organic radical which has at least one primary, secondary (eg. —$NHR^1$) or tertiary amino group (eg. —$NR^1R^2$) or at least one ammonium group —$N^{\oplus}R^{14}R^{15}R^{16}X^{\ominus}$, where $X^{\ominus}$ is $F^{\ominus}$, $Cl^{\ominus}$, $Br^{\ominus}$, $HSO_4^{\ominus}$, $SO_4^{2\ominus}$, $H_2PO_4^{\ominus}$, $HPO_4^{2\ominus}$ or $PO_4^{3\ominus}$ and $R^{14}$, $R^{15}$ and $R^{16}$ are organic radicals independent of one another (eg. independently of one another and independently of $R^1$, are the same groups as $R^1$), $R^{12}$, independently of $R^{11}$, is one of the same groups as $R^{11}$ or —H, —OH, $C_1$–$C_4$-alkyl, —$COO^{\ominus}M^{\oplus}$, —C≡CH,

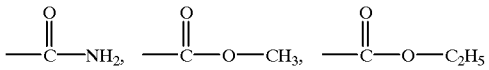

or hydroxyl-substituted $C_1$–$C_4$-alkyl (eg. hydroxyethyl or hydroxypropyl) or $R^{11}$ and $R^{12}$ together are the oxygen of a carbonyl group and

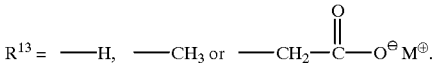

Preferably, $R^1$=$R^2$=$R^5$=$R^6$=$R^{1'}$=$R^{2'}$=$R^{5'}$=$R^{6'}$=—$CH_3$.

Examples of typical N-oxyl radicals suitable according to the invention are 4-hydroxy-2,2,6,6-tetramethyl-1-oxylpiperidine, 4-hydroxy-2,6-diphenyl-2,6-dimethyl-1-oxylpiperidine, 4-carboxy-2,2,6,6-tetramethyl-1-oxylpiperidine, 4-carboxy-2,6-diphenyl-2,6-dimethyl-1-oxylpiperidine, 3-carboxy-2,2,5,5-tetramethyl-1-oxylpyrrolidine, 3-carboxy-2,5-diphenyl-2,5-dimethyl-1-oxylpyrrolidine, 4-acetyl-2,2,6,6-tetramethyl-1-oxylpiperidine, N,N'-bis(1-oxyl-2,2,6,6-tetramethylpiperidin-4-yl)-N,N'-bisformyl-1,6-diaminohexane and bis(1-oxyl-2,2,6,6-tetramethylpiperidin-4-yl) adipate.

The preparation of 3-carboxy-2,2,5,5-tetramethyl-1-oxylpyrrolidine is described, for example in Romanelli, M., Ottaviani, M.F., Martini, G., Kevan, L., JPCH J: Phys. Chem., EN, 93, 1 (1989), 317–322.

The compounds (VI) and (VII) can be obtained according to U.S. Pat. No. 4,655,185 (eg. Example 7) and DE-A 19510184.

Further suitable typical examples are:

| | |
|---|---|
| 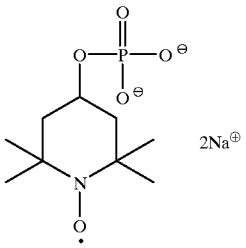 | Sunamoto, Junzo; Akiyoshi, Kuzunari, Kihara, Tetsuji; Endo, Masayuki, BCS JA 8, Bull, Chem. Soc. Jpn., EN, 65, 4 (1992), 1041–1046; |
| 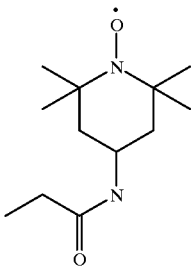 | Beilstein Registry Number 6926369 ($C_{11}H_{22}N_3O_2$); |
| 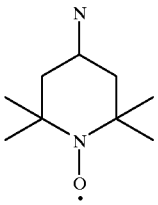 | Beilstein Registry Number 6498805 (4-amino-2,2,6,6-tetramethyl-1-oxyl-piperidine); |
| 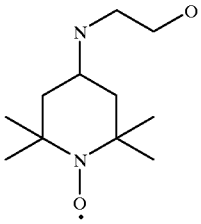 | Beilstein Registry Number 6800244 ($C_{11}H_{23}N_2O_2$); |
| 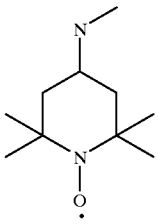 | Beilstein Registry Number 5730772 (N-methyl-4-amino-2,2,6,6-tetra-methyl-1-oxylpiperidine; |
| 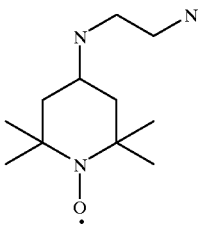 | Beilstein Registry Number 5507538 (2,2,6,6-tetramethyl-4-(2-amino-ethylamino)-1-oxylpiperidine); |

-continued

| | |
|---|---|
| 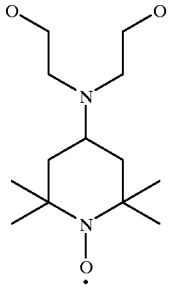 | Beilstein Registry Number 4417950 (4<bis(2-hydroxyethyl)>-amino-2,2,6,6-tetramethyl-1-oxyl-piperidine); |
| 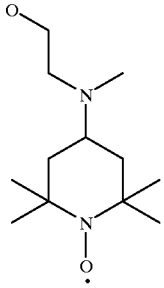 | Beilstein Registry Number 4396625 ($C_{12}H_{25}N_2O_2$); |
| 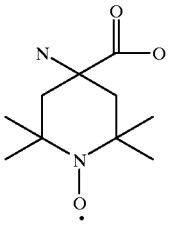 | Beilstein Registry Number 4139900 (4-amino-2,2,6,6-tetra-methyl-4-carboxy-1-oxylpiperidine); |
| 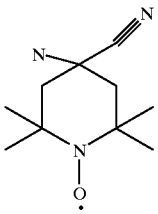 | Beilstein Registry Number 4137088 (4-amino-4-cyano-2,2,6,6-tetra-methyl-1-oxylpiperidine); |
| 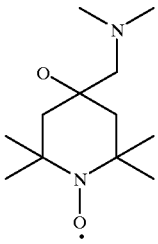 | Beilstein Registry Number 3942714 ($C_{12}H_{25}N_2O_2$); |
| 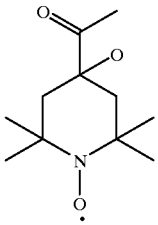 | Beilstein Registry Number 1468515 (2,2,6,6-tetramethyl-4-hydroxy-4-acetyl-1-oxylpiperidine); |

-continued

| | |
|---|---|
| 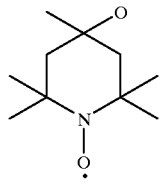 | Beilstein Registry Number 1423410 (2,2,4,6,6-pentamethyl-4-hydroxy-1-oxylpiperidine); |
| 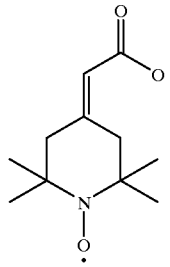 | Beilstein Registry Number 6205316 (4-carboxymethylene-2,2,6,6-tetra-methyl-1-oxylpiperidine); |
| 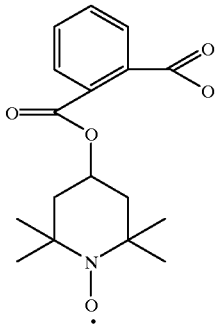 | Beilstein Registry Number 1395538 (4-<2-carboxy-benzoyloxy>-2,2,6,6-tetramethyl-1-oxylpiperidine); |
| 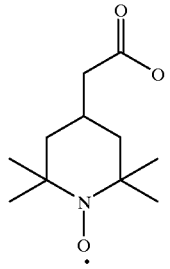 | Beilstein Registry Number 3546230 (4-carboxymethyl-2,2,6,6-tetra-methyl-1-oxylpiperidine); |
| 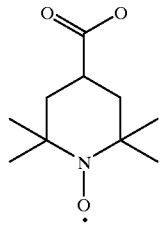 | Beilstein Registry Number 3949026 (4-carboxyl-2,2,6,6-tetra-methyl-1-oxylpiperidine); |

-continued
| | |
|---|---|
| 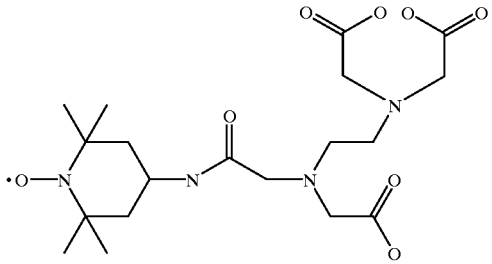 | Beilstein Registry Number 4611003 (N-(1-oxy-2,2,6,6-tetra-methylpiperidine-4-yl)-ethylenediaminetetraacetamide); |
| 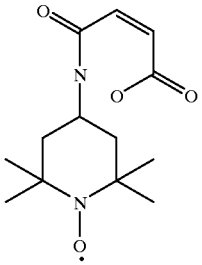 | Beilstein Registry Number 5961636 ($C_{13}H_{21}N_2O_4$) |
| 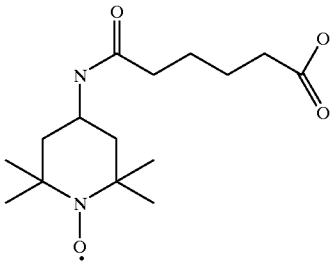 | Beilstein Registry Number 5592232 ($C_{15}H_{27}N_2O_4$); |
| 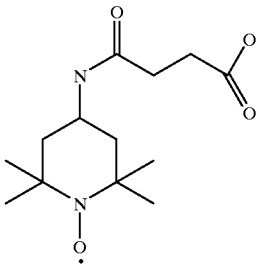 | Beilstein Registry Number 5080576 (N-(2,2,6,6-tetramethyl-1-oxyl-piperidin-4-yl)succinamide; |
| 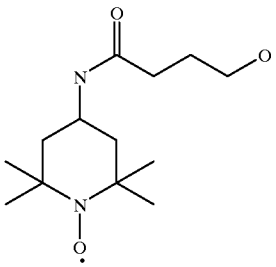 | Beilstein Registry Number 5051814 (4-(4-hydroxybutanoylamino)-2,2,6,6-tetramethyl-1-oxylpiperidine); |

-continued

| | |
|---|---|
| 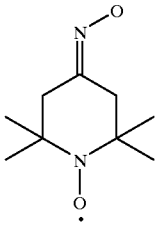 | Beilstein Registry Number 4677496 (2,2,6,6-tetramethyl-4-oximino-1-oxylpiperidine); |
| 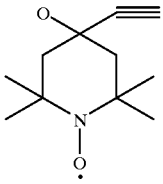 | Beilstein Registry Number 1451068 ($C_{11}H_{18}NO_2$); |
| 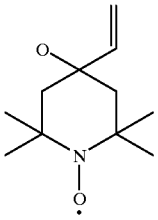 | Beilstein Registry Number 1451075 ($C_{11}H_{20}NO_2$); |
| 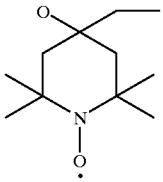 | Beilstein Registry Number 1423698 (4-ethyl-4-hydroxy-2,2,6,6-tetra-methyl-1-oxylpiperidine); |
| 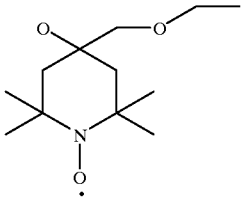 | Beilstein Registry Number 5509793 (4-ethoxymethyl-4-hydroxy-2,2,6,6-tetramethyl-1-oxylpiperidine); |
| 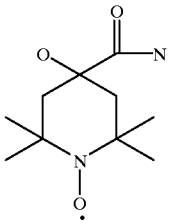 | Beilstein Registry Number 3960373 ($C_{10}H_{19}N_2O_3$); |
| 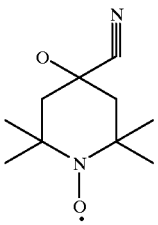 | Beilstein Registry Number ($C_{10}H_{17}N_2O_2$); |

-continued

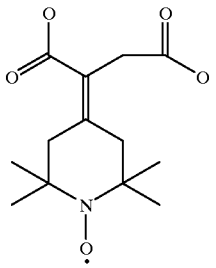

Beilstein Registry Number 3985130 ((2,2,6,6-tetramethyl-1-oxyl-4-piperidylidene)succinic acid).

According to the invention, mixtures of an N-oxyl radical can of course also be used in addition to phenothiazine.

Organic nitroso compounds suitable according to the invention are, for example, N-nitrosoarylamines or nitroso compounds having a nitroso group bonded directly to a carbon atom of an aromatic nucleus. Examples are nitrosophenols, such as 4-nitrosophenol, nitrosonaphthols, such as 2-nitroso-1-naphthol, nitrosobenzene, N-nitroso-N-methylurea, nitroso-N,N-dialkylanilines where alkyl is methyl, ethyl, propyl and/or butyl, N-nitrosodiphenylamine, N-nitrosophenylnaphthylamine, 4-nitrosodinaphthylamine and p-nitrosodiphenylamine. According to the invention, mixtures of the abovementioned nitroso compounds can of course also be used in addition to phenothiazine.

p-Phenylenediamines suitable according to the invention are those of the general formula X

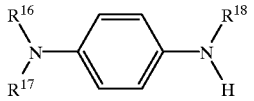

(X)

where $R^{16}$, $R^{17}$ and $R^{18}$, independently of one another, are each alkyl, aryl, alkaryl or aralkyl or up to 20 carbon atoms or hydrogen.

Compounds x where $R^{16}$, $R^{17}$ and $R^{18}$, independently of one another, are each methyl, ethyl, propyl, isopropyl, isobutyl, sec-butyl, n-butyl, pentyl, phenyl or naphthyl are particularly suitable. Examples of suitable compounds X are: N,N'-bis-sec-butyl-p-phenylenediamine, N-phenyl-N'-isopropylphenylenediamine, N-naphthyl-N'-sec-butyl-p-phenylenediamine, N,N,N'-trimethyl-p-phenylene-diamine, N,N,N'-triethyl-p-phenylenediamine, N,N-dimethyl-p-phenylenediamine, N,N-diethyl-p-phenylenediamine, N-phenyl-N',N'-dimethyl-p-phenylenediamine, N-phenyl-N',N'-diethyl-p-phenylenediamine, N-phenyl-N',N'-dipropyl-p-phenylenediamine, N-phenyl-N',N'-di-n-butyl-p-phenylenediamine, N-phenyl-N',N'-di-sec-butyl-p-phenylenediamine, N-phenyl-N'-methyl-N'-ethyl-p-phenylenediamine, N-phenyl-N'-methyl-N'-propyl-p-phenylene-diamine, N-phenyl-N'-methyl-p-phenylenediamine, N-phenyl-N'-ethyl-p-phenylenediamine, N-phenyl-N'-propyl-p-phenylenediamine, N-phenyl-N'-isopropyl-p-phenylenediamine, N-phenyl-N'-butyl-p-phenylenediamine, N-phenyl-N'-isobutyl-p-phenylenediamine, N-phenyl-N'-N'-sec-butyl-p-phenylenediamine, N-phenyl-N'-tert-butyl-p-phenylenediamine, N-phenyl-N'-n-pentyl-p-phenylenediamine, N-phenyl-N'-n-hexyl-p-phenylenediamine, N-phenyl-N'-(1-methylhexyl)-p-phenylenediamine, N-phenyl-N'-(1,3-dimethylbutyl) -p-phenylenediamine, N-phenyl-N'-(1,4-dimethylpentyl)-p-phenylenediamine and p-phenylenediamine. According to the invention, mixtures of p-phenylenediamines may also be used in addition to phenothiazine. Particularly suitable mixtures of this type are the p-phenylenediamine mixtures recommended in WO 92/01665.

According to the invention, mixtures of all different abovementioned polymerization inhibitors may of course also be used in addition to phenothiazine. Phenothiazine solutions which are preferred according to the invention are those whose total content of polymerization inhibitor comprises at least 50, particularly preferably at least 75, very particularly preferably at least 90, % by weight of phenothiazine. Particularly advantageously, no further polymerizatrion inhibitor apart from phenothiazine is present in the inhibitor solution to be added according to the invention.

As a rule, the content of phenothiazine in the inhibitor solutions to be used according to the invention is at least 10, preferably at least 20, particularly preferably at least 30, % by weight, based on the solution. Frequently, the phenothiazine content based on the solution is from 35 to 45% by weight. As a rule, the phenothiazine content, based as above, of the solution to be added according to the invention will, for viscosity reasons alone, not be above 60% by weight.

According to the invention, a solution of phenothiazine in methylpyrrolidone, whose phenothiazine content is advantageously from 35 to 50, or from 40 to 50, % by weight, based on the solution, is preferred. Frequently, the phenothiaziane content of the abovementioned solution is 45% by weight.

The novel process is suitable for immediately terminating any type of free radical polymerizations, in particular those unintentional and/or runaway free radical polymerizations mentioned at the beginning of this publication.

These include in particular the unintentional free radical polymerizations of those substances which comprise at least 95 or at least 98 or at least 99 or 100% by weight of (meth)acrylic monomers. Particularly suitable (meth)acrylic monomers are (meth)acrylic acid and esters or (meth)acrylic acid and monohydric or polyhydric alcohols. This applies in particular when the monohydric or polyhydric alkanols are of one to twenty carbon atoms or one to twelve carbon atoms or one to eight carbon atoms. Typical examples of such esters are for example methyl acrylate, ethyl acrylate, n-butyl acrylate, isobutyl acrylate, tert-butyl acrylate, 2-ethylhexyl acrylate, methyl methacrylate, ethyl methacrylate, n-butyl methacrylate and tert-butyl methacrylate.

In a manner advantageous in terms of application, the phenothiazine solution to be added according to the invention is introduced via a spray nozzle in order to achieve a very rapid homogeneous distribution in the system undergoing free radical polymerization. The abovementioned homogenization can of course also be supported by circulation and/or stirring. However, such mechanical aids also give rise to the danger of acceleration of the polymerization since they simultaneously introduce energy into the system undergoing free radical polymerization. The phenothiazine solution to be introduced is advantageously contained in a suitable storage container. If the novel process is used for immediately terminating the free radical polymerization of (meth)acrylic monomers unintentionally undergoing mass polymerization, the total amount of phenothiazine added should be from about 0.01 to 3% by weight, based on the (meth)acrylic monomers. As a rule from 0.01 to 0.05, often 0.025, % by weight is sufficient.

EXAMPLES

Example 1

500 ml of 2-ethylhexyl acrylate stabilized with 10 ppm by weight of MEHQ was introduced under nitrogen into a stirred vessel having an internal volume of 1 liter and immersed in an oil bath heated to 100° C. The stirred vessel was connected via a valve to a 50 ml storage vessel which contained 10 ml of a 40% strength by weight solution of phenothiazine in N-methylpyrrolidone and was under a gage pressure of 9.5 bar. A valve mounted between stirred vessel and storage vessel was controlled by means of a temperature sensor immersed in the stirred vessel. The control was adjusted so that, when 105° C. was exceeded in the stirred vessel, the valve automatically opened, the phenothiazine solution present in the storage vessel was forced into the stirred vessel and at the same time the heating was stopped. The valve control was triggered 75 hours after the 2-ethylhexyl acrylate had been introduced into the stirred vessel. The incipient polymerization of the 2-ethylhexyl acrylate was immediately stopped. The content of the stirred vessel still had a low viscosity and could be readily and completely emptied.

Comparison Example

The procedure was as in Example 1, except that the storage vessel contained only 10 ml of N-methylpyrrolidone. The valve control was triggered 81 hours after the 2-ethylhexyl acrylate had been introduced into the stirred vessel. Within 0.7 hour, the 2-ethylhexyl acrylate had polymerized to a high-viscosity material.

Example 2

The table below shows the results of investigations into the solubility of phenothiazine in various solvents at 25° C.

TABLE

| Solvent | Solubility (% by weight) |
|---|---|
| N-Methylpyrrolidone | >20 |
| N-Ethylpyrrolidone | >20 |
| Biphenyl | <20 |
| Toluene | <20 |
| Xylene | <20 |
| n-Butyl acetate | <20 |
| 2-Ethylhexyl acetate | <20 |
| Dimethyl phthalate | <20 |

We claim:

1. A process for immediately terminating a free radical polymerization of at least one monomer comprising adding a phenothiazine-containing inhibitor solution to a system undergoing free radical polymerization, wherein the solvent of the inhibitor solution comprises at least 50% of its weight of an N-alkylpyrrolidone; and wherein the content of phenothiazine in the inhibitor solution is at least 10% by weight based on the solution.

2. A process as claimed in claim 1, wherein the N-alkylpyrrolidone is N-methylpyrrolidone or N-ethylpyrrolidone.

3. A process as claimed in claim 1, wherein the phenothiazine content of the inhibitor solution is at least 10% by weight, based on the weight of the inhibitor solution.

4. A process as claimed in claim 1 to 3, wherein the system undergoing free radical polymerization comprises (meth) acrylic monomers undergoing free radical mass polymerization.

5. A process as claimed in claim 4, wherein the (meth) acrylic monomer is (meth)acrylic acid.

6. A process as claimed in claim 4, wherein the (meth) acrylic monomer is a (meth)acrylic ester.

7. Apparatus for immediately terminating a free radical polymerization, said apparatus comprising a spray nozzle, and said apparatus containing a phenothiazine-containing inhibitor solution, wherein the solvent of the inhibitor solution comprises at least 50% of its weight of an N-alkylpyrrolidone.

8. An inhibitor solution containing phenothiazine and at least 50% of its weight of an N-alkylpyrrolidone.

9. A solution as claimed in claim 8, containing phenothiazine and at least 50% of its weight of N-methylpyrrolidone.

10. The process of claim 1, wherein the phenothiazine-containing inhibitor solution is introduced to said system by means of a spray nozzle.

* * * * *